United States Patent
Sun et al.

(10) Patent No.: US 6,751,213 B1
(45) Date of Patent: Jun. 15, 2004

(54) TOKEN OVER ETHERNET PROTOCOL

(75) Inventors: Peter C. P. Sun, San Jose, CA (US); Gary J. L. Lin, Honolulu, HI (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 09/534,548

(22) Filed: Mar. 27, 2000

Related U.S. Application Data
(60) Provisional application No. 60/173,051, filed on Dec. 24, 1999.

(51) Int. Cl.[7] .............................................. H04L 12/66
(52) U.S. Cl. ....................... 370/352; 370/450
(58) Field of Search ................ 370/450, 451, 370/352, 455, 445, 474, 454, 452, 400, 468, 458; 340/825.5, 452

(56) References Cited

U.S. PATENT DOCUMENTS

| | | | |
|---|---|---|---|
| 4,667,323 A | * 5/1987 | Engdahl et al. ............. 370/451 |
| 4,726,018 A | * 2/1988 | Bux et al. .................... 370/455 |
| 4,785,449 A | * 11/1988 | Nakamura et al. .......... 370/451 |
| 4,819,229 A | 4/1989 | Pritty et al. ................... 370/89 |
| 4,858,232 A | * 8/1989 | Diaz et al. ................... 370/465 |
| 4,866,706 A | * 9/1989 | Christophersen et al. ... 370/400 |
| 5,253,252 A | * 10/1993 | Tobol .......................... 370/452 |
| 5,274,637 A | * 12/1993 | Sakamura et al. .......... 370/455 |
| 5,341,374 A | * 8/1994 | Lewen et al. ............... 370/450 |
| 5,742,596 A | 4/1998 | Baratz et al. ............... 370/356 |
| 5,983,068 A | 11/1999 | Tomich et al. .............. 455/3.1 |
| 6,006,271 A | 12/1999 | Grabiec et al. ............. 709/235 |

OTHER PUBLICATIONS

Venkatramani et al., "Design, Implementation, and Evaluation of a Software–based Real–Time Ethernet Protocol", Dept. of Computer Science, St. Univ. of NY@ Stony Brook.
Varadarajan et al., "Fault Recovery in a Real–Time Switched Ethernet Architecture", Dept. of Computer Science, St. Univ. of NY@ Stony Brook.

* cited by examiner

Primary Examiner—Chi Pham
Assistant Examiner—Alexander O. Boakye
(74) Attorney, Agent, or Firm—Bradley T. Sako; Stephen B. Ackerman

(57) ABSTRACT

A token over Ethernet protocol is described which allows a plurality of ports connected to a shared channel to communicate with each other. The communication is controlled by tokens that are transmitted before the transmission of packets. A packet can contain digital data from a digital device such as a computer, or digitized voice signals from a voice device such as a telephone. Voice packets are given priority over data packets to minimize delays that might provide distortion to the received voice signal. Each transmitted token identifies the next port to transmit which is determined from a valid list maintained within each port. All ports can receive tokens and packets during any receiving cycle, but only the port authorized by the last transmitted token can transmit a token, or a token and a packet. All ports check each transmitted token for a turn at transmitting information.

17 Claims, 4 Drawing Sheets

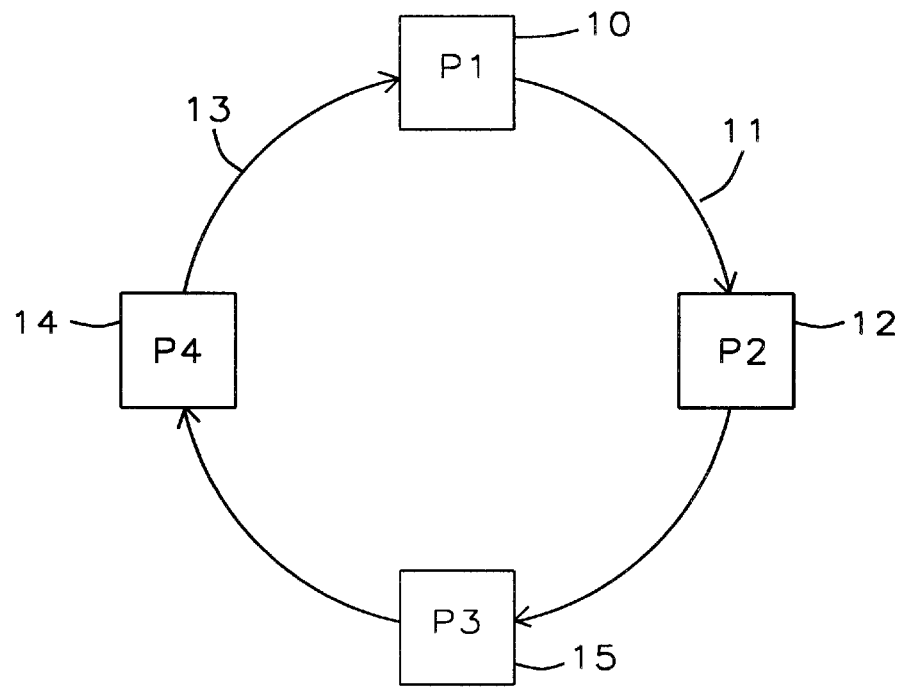
*FIG. 1 - Prior Art*
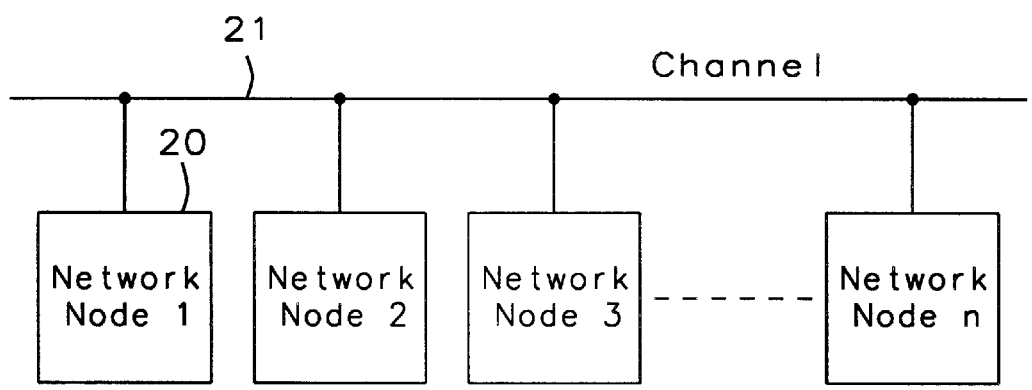
*FIG. 2*

TOKEN OVER ETHERNET PROTOCOL

This application claims the benefit of Provisional application No. 60/173,051, filed Dec. 24, 1999.

BACKGROUND OF THE INVENTION

1. Field of Invention

The present invention relates to communication on a shared media and more specifically to a protocol for controlling data traffic on the shared media.

2. Description of Related Art

Available products and technologies that mix digital signals over the same channel suffer from either insufficient bandwidth or extended delays. This results in poor quality voice signals being delivered. The human ear is very sensitive to poor quality voice signals; and therefore, it is important to deliver voice signals with enough bandwidth and little delay to provide a quality voice signal without distortion.

In U.S. Pat. No. 6,006,271 (Grabiec et al.) a collision avoidance and contention resolution protocol is provided for networks with nodes communication over a shared communication medium. The protocol uses a carrier modulation scheme with multiple frequencies is used where nodes wanting to communicate simultaneously transmit a single frequency selected randomly from a set of frequencies during a time of contention. In U.S. Pat. No. 5,983,068 (Tomich et al.) a photonic home area network for interfacing an external communication network is described. The network is between a plurality of building containing both commercial a residential buildings. The network delivers television and audio data including telephone service. A photonic multi-access channel is used with a bi-directional electrical interface at each port into the channel. In U.S. Pat. No. 5,742,596 (Baratz et al.) a network based distributed private branch exchange (PBX) is described where clients communicate through regular telephones connected to client telephony modules connected to a host computer. The central office telephone lines terminate in another computer. Data is transferred over the network by digitizing voice signals for transmission and converting back to analog signals at a receiver. In U.S. Pat. No. 4,819,229 (Pritty et al.) describes a LAN priority control system with an interrupt priority control structure which allows transmission of a packet by a node with a higher priority message. A within packet interrupt scheme is used to interrupt a message.

In "Design Implementation and Evaluation of a Software-based Real-time Ethernet Protocol", Venkatramani et al., Department of Computer Science, State University of New York at Stony Brook, a software based timed token protocol is described called RETHER which provides real time performance guarantees for multimedia applications operating on existing Ethernet hardware. In "Fault Recovery in a Real Time Switched Ethernet Architecture", Varadarajan et al., Department of Computer Science, State University of New York at Stony Brook, a real time switched architecture, EtheReal, is described. A transparent connection oriented mechanism is provided to deliver bandwidth guarantees over Ethernet networks without changes to network hardware and system and device drivers.

An ordinary Ethernet network uses the carrier sense multiple access with collision detection (CSMA/CD) protocol to control network traffic. In a system using CSMA/CD a node wanting to transmit checks to see if the communication channel is idle. If the channel is idle, the node transmits its packet of data. If the channel is busy, the node waits for the channel to become idle before transmitting data. If there is a collision between the data being transmitted from the node and data from another node, the packet transmission is stopped, a jam signal is transmitted, and after a wait for a random period of time the node again checks the channel to see if it is idle. If the channel is idle the node again starts to transmit its data. A large amount of bandwidth is used during a collision making the CSMA/CD less than ideal for transmitting voice data without introducing distortions because of the delays caused by collisions.

SUMMARY OF THE INVENTION

In the present invention a plurality of nodes communicate data and voice signals over a share communication channel using tokens over Ethernet protocol (TEP) to provide a guaranteed bandwidth allocated to each node connected to the channel. The channel can be any communication medium such as a conduction medium like wire, or a transmission medium like air. The TEP uses a token controller to guide traffic in the shared medium so that signals can be delivered with minimal delay and adequate bandwidth. Using tokens to control the flow of information in the form of Ethernet packets on the shared channel insures that the network will not waste bandwidth on collisions.

All nodes connected to the shared channel listen to communications on the channel and can receive voice or data packets at any time. However, nodes only send data on the channel when it is their turn. A valid list of active nodes is maintained at each node which describes when a node is allowed to transmit data onto the channel. If a node is added or dropped from the channel a token is sent to all nodes which updates the valid list in the possession of each node. A token which notifies all other nodes which node transmits next is sent by a transmitting node at the end of the transmitting node's turn to send data or voice packets.

Because of the sensitivity of voice data quality to delays in transmission, priority is given to voice packets over data packets by a transmitting node. If a node has a data packet and a voice packet ready to transmit, the node will transmit the voice packet after receiving a token authorizing it as the next to transmit. The data packet will be reserved for the next transmission time when there is not a contending voice packet. It is conceivable that a data packet could wait for more than one turn before transmission, but a voice packet will always be transmitted if the voice packet is available for transmission when a token is received with the nodes address as next to transmit.

Before transmitting a node will check to see if the shared channel is quiet to avoid a collision and will listen while transmitting. Although the TEP scheme is intended to prevent collisions by allocating time slot to each node on a channel, there is still a possibility of a collision for a non-typical operation. A non-typical operation is when a node is determined to have been skipped in the sequence of permitted transmissions. The skipped node would then issue a collision pattern until the channel becomes idle, and transmit an updated token indicating in the token command the need to add the address of the skipped node to the valid list of all other nodes. A transmitting node detecting the collision pattern will cancel transmission and return to listening to the channel for a token with notification that the node is next to transmit.

A network node that receives a token or packet checks to see if there is an error. This is done by calculating the cyclic redundancy code (CRC) for the token or packet that was received and comparing the calculated result with the CRC contained within the packet or token. If an error is found in a packet, the packet is discarded and a token is issued requesting a retransmission of the packet. Similarly, when a token is received with an error the token is discarded and a token is sent requesting a retransmission of the token that was in error. The transmission of tokens requesting a retransmission is done when it is the nodes turn to transmit after receiving a token with its address as next to transmit.

BRIEF DESCRIPTION OF THE DRAWINGS

This invention will be described with reference to the accompanying drawings, wherein:

FIG. 1 show a token ring structure of prior art,

FIG. 2 shows a block diagram of a plurality of network nodes connected to a shared channel.

DETAILED DESCRIPTION OF THE PREFERRED EMBODIMENT

Figure 3A:
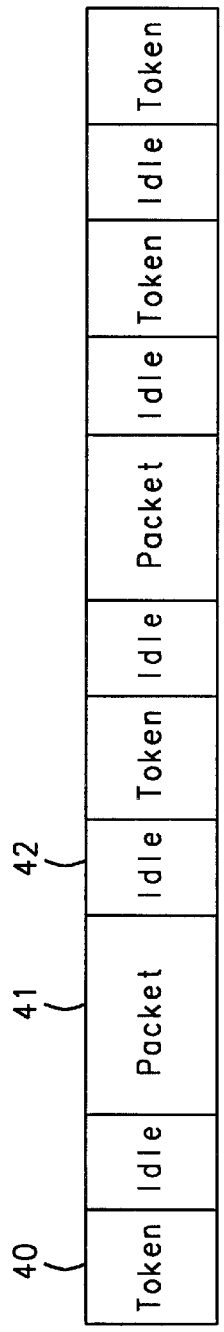
FIG. 3a shows the structure of data transmitted on the shared channel.

In FIG. 1 is shown a token ring structure for communicating between nodes in a ring fashion where communication is in a single direction 11 such that a first node 10 sends information to a second node 12 and receives information 13 from a third node 14. If the first node 10 wants to send information to the third node 14, the information must be forwarded by the second node 12 and any other intermediate nodes 15 between the first node 10 and the third node 14. This scheme can have a fixed bandwidth for each node, but the drawback is when any node is broken, the whole network is down.

FIG. 2 shows a block diagram network nodes 20 connected to a shared channel 21. A number of network nodes 20 ranging between "1" to "n" are connected to the shared channel 21 and communicate with each other over the channel 21. Each network node 20 is identified by a unique address that is used as a destination address for information which is sent.

FIG. 3a shows a flow of information on the shared channel 21. Tokens 40 containing control information and packets 41 are commingled on the channel 21 separated by idle times 42. A packet 41 contains voice or data from a port and is always preceded by a token 40 which provides the address of the next port that is permitted to transmit. A token 40 may be transmitted without a packet 41 preceding it. A receiving port 20 can drop a packet or token because of an error or a collision, and request a retransmission.

Figure 3B:
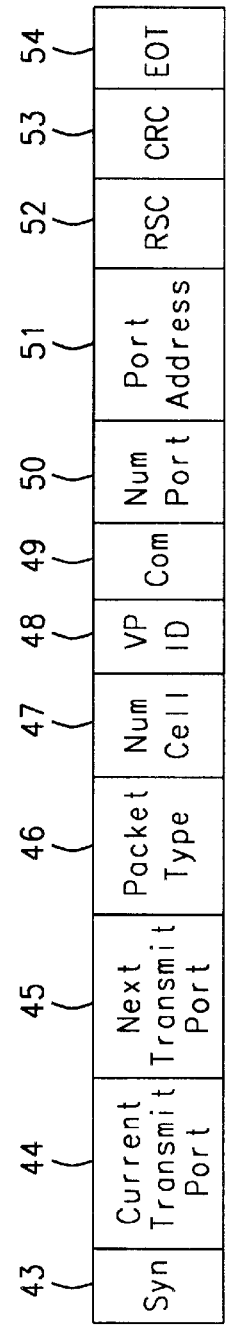
FIG. 3b shows the data structure of a token transmitted over the shared channel.

In FIG. 3b is shown the format of a token 40. A token 40 is broadcast to all ports along the channel 21. Tokens 40 contain control information that is used by every port 20 to avoid collisions. The first piece of information contained in a token is SYN 43 which contains synchronization bits. Following the SYN field 43 is the Current Transmit Port field 44 which contains the current transmit port address. Following the Current Transmit Port field 44 is Next Transmit Port field 45 which contains the next port that is permitted to transmit onto the channel 21. The Next Transmit Port field 45 is updated sequentially by the transmitting port by referring to the valid list of ports which is maintained by each port. Following the Next Transmit Port field 45 is the Packet Type 46 which defines the type of packet, voice or data, that is going to be sent following the token. Following the Packet Type field 46 is the Number of Cell field 47 which contains the size of the packet following the current token. The VP ID field 48 contains a voice packet ID that is used if a retransmission is necessary. The Com field 49 contains commands to be used by a receiving port. An example of instructions for the Com field 49 is: 0—no action; 1—retransmit bad voice packet; 2—remove port; 3—add port; 4—received bad token; and 5—received bad token and bad voice packet. The Num Port field 50 defines the number of the port that needs to retransmit a token. The Port Address field 51 contains the address of the port which is being requested to retransmit. The RCS field 52 contains the Reed Solomon code for error correction of the token. The CRC field 53 contains cyclic redundancy code that is used to check if there is an error in the transmission of the token. The EOT field 54 signals the end of the token.

Figure 3C:
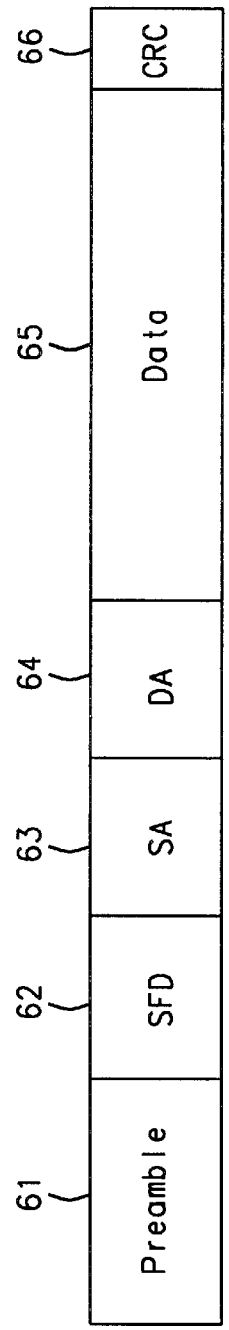
FIG. 3c shows the structure of a voice and data packet transmitted over the shared channel.

In FIG. 3c is shown the format of a packet. 41. The Preamble 61 contains synchronization signals. The SFD field 62 is the start of frame delimiter and the SA field 63 contains the source address of the port sending the packet 41. The DA field 64 contains the destination address of the packet 41, and the information being transmitted by the packet is found in the Data field 65. The data contained in the Data field 65 can be either a data packet or a voice IP packet. The final field in the packet is a CRC field 66 used for error detection of information contained in the packet.

Figure 4:
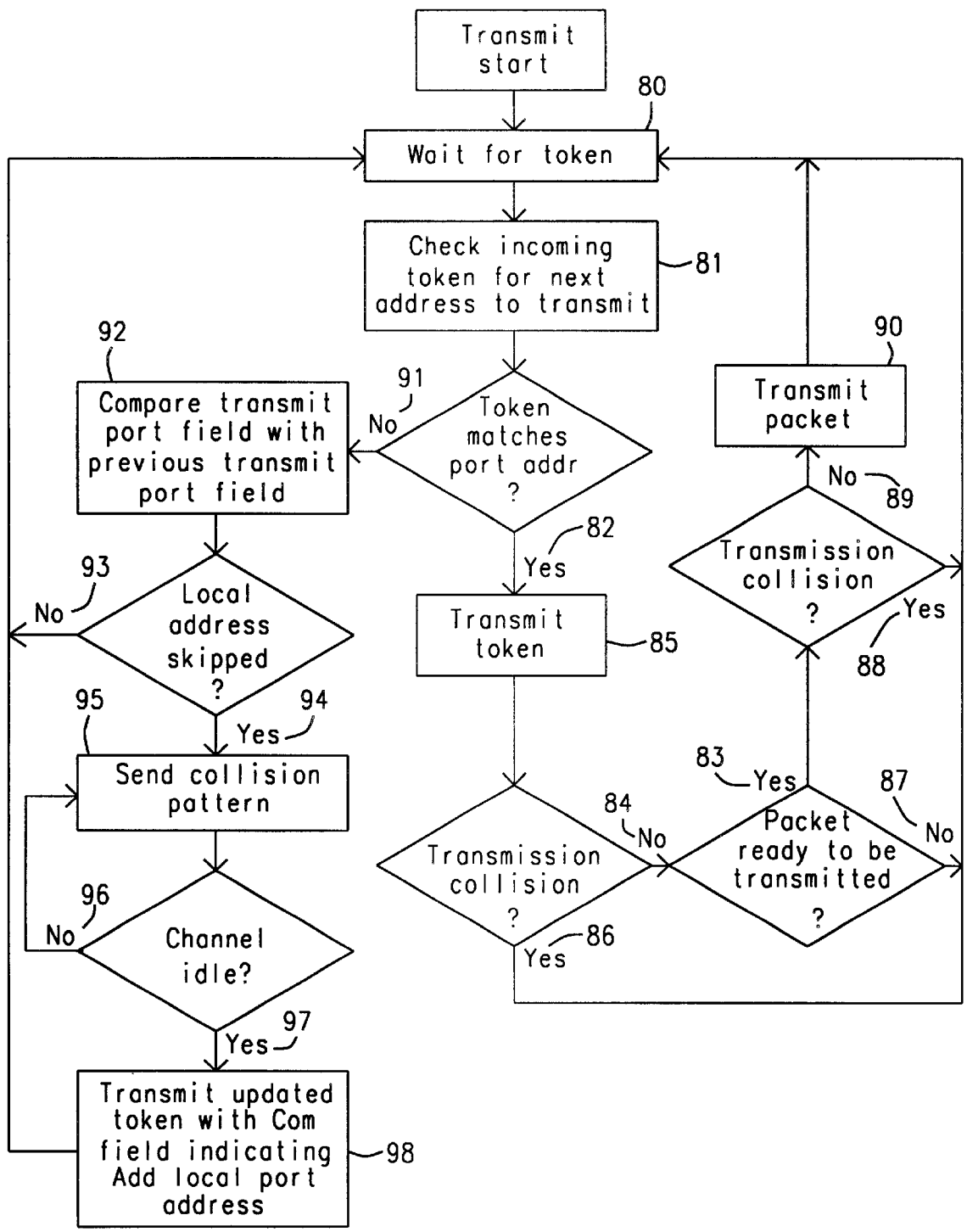
FIG. 4 is a flow diagram of the method of transmitting packets and tokens over the shared channel.

In FIG. 4 is shown a flow diagram for the method of transmitting packets 41 and tokens 40 onto the shared channel 21. A network node 20 operating as a port on the shared channel waits and listens to communications on the channel waiting for a token to be transmitted on the channel 80. An incoming token is checked for the next address to transmit 81. If the port address of the network node 20 matches the Next Transmit Port field 45 of the incoming token 82, then the network node starts to transmit a token 85. The network node 20 then checks to determine if there is a collision in the channel 21. If there are no transmission collisions 84 and if a packet is ready to be sent 83, then the network node 20 transmits a waiting packet 90 if there is no transmission collision 89. If there is a transmission collision 86, a token is not transmitted and the port returns to listening to the channel waiting for a token 80. If there is a transmission collision during transmission of the packet 88, a packet is not transmitted and the port returns to listening to the channel waiting for a token 80. If a packet is not ready for transmission 87, the port returns to listening to the channel waiting for a token 80. The next port address allowed to transmit is obtained from the valid list maintained in the network node 20 that is transmitting the packet 90. If there is no packet ready for transmission 87 and if there is a transmission collision on the channel 88, no token is transmitted and the network node 20 returns to listening to the channel for an incoming token 80.

Continuing to refer to FIG. 4, if a token Next Transmit port address 45 does not match the port address of the network node 91, the Transmit Port field 51 of the token is compared with the Transmit Port field 51 of the previous token 92. If the local address of the port has not been skipped 93, the port returns to waiting for the next token 80. The port address is determined not skipped when the address of the network node 20 does not fall between the address in the Transmit Port field 51 of the present token and that of the previous token. If the address of the port has been skipped 94 by determining that the local address does fall between the addresses in the Transmit Port fields 51 of the present token and the previous token, then the transmit unit 30 of the network node 20 sends a collision pattern 95 to make the shared channel 21 idle. If the channel is not idle 96, a collision pattern 95 is sent until the channel is idle 97. A token is updated to indicate in the Com field 54 to add the local port address which is added to the Port Address field 56 of the token. This token indicates to all other ports that they need to update their valid list of ports to include the address of the network node 20.

Figure 5:
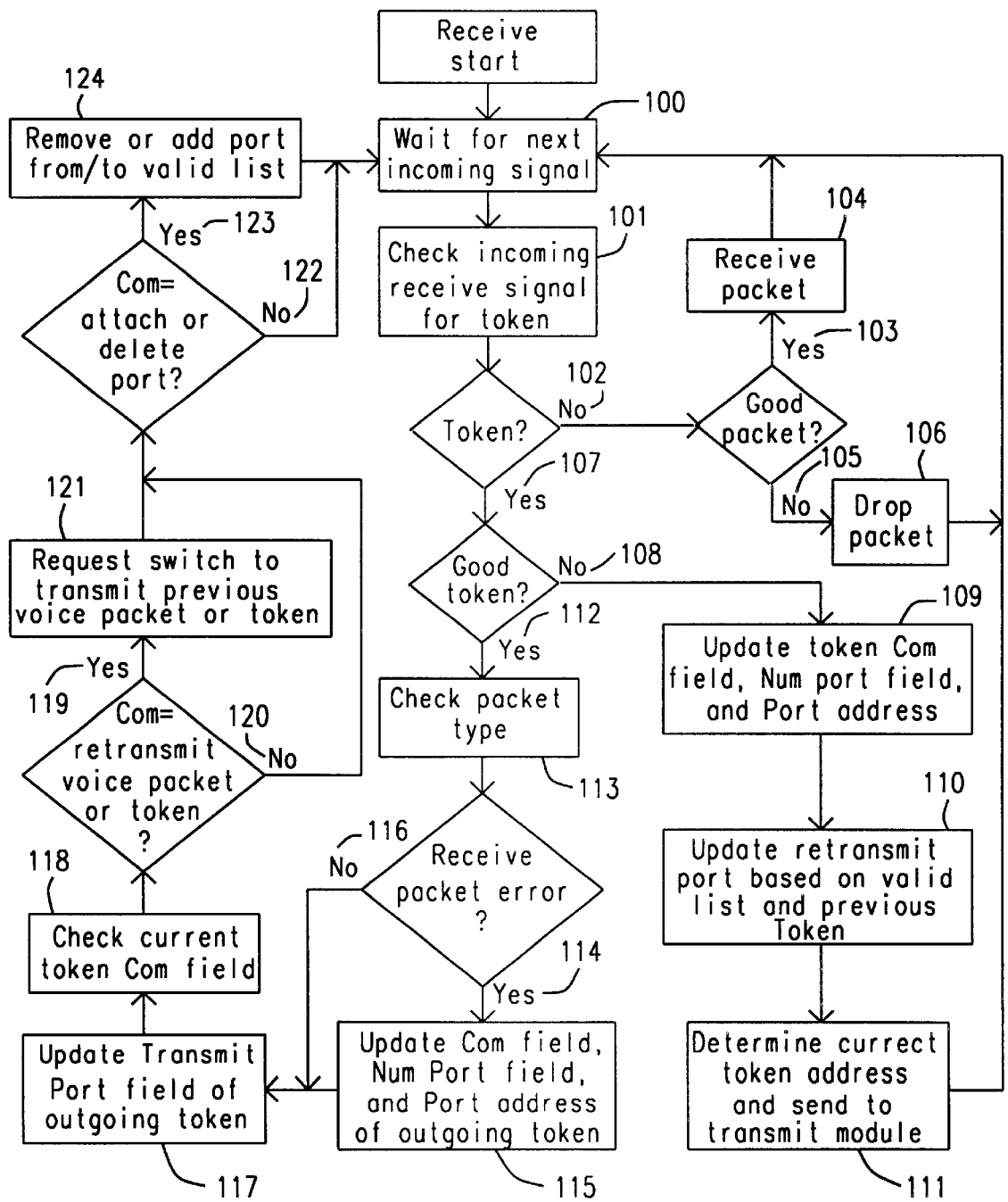
FIG. 5 is a flow diagram of the method of receiving packets and tokens over the shared channel.

Referring to FIG. 5, a port is waiting for an incoming signal 100, and checks a received signal to determine if it is a token 101. If the incoming signal is a packet and not a token 102 and if the packet is good 103, then the packet is received 104 and the port returns to waiting for the next incoming signal 100. If the packet is not good because a calculated CRC does not match the CRC field 66 of the packet, then the packet is dropped and the port returns to waiting for the next incoming signal 100. If the incoming signal is a token 107 but the token is not good 108 because a calculated CRC does not match the CRC field in the token, then the received token is dropped, and an updated token is created 109 with a request for retransmission inserted in the Com field 54, to be sent to the port address that is inserted into the Num Port field 55 and to be sent from the address inserted in the Port Address field 56. The update of the retransmit port is based on the valid list and the Transmit Port field of the previous token 110. Based on the previous token determine the current updated tokens address and send to the transmitting module 111.

Continuing to refer to FIG. 5, if the received token is good 112, the Pack Type field of the token is checked 113 to see if the packet received just prior to the token is a voice or data type. If the packet is data type, the packet is sent to a connected digital device. If the packet is a voice type packet, then the packet is converted to a voice signal and connected to an attached voice device. If the packet received just prior to the token has an error 114, then the Com field 54 of an outgoing token is updated 115 to request retransmission of the packet, to be sent to the port address that is inserted into the Num Port field 55 and to be sent from the address inserted in the Port Address field 56. The Transmit Port field 52 of the outgoing token is updated with the next port to transmit from the from the valid list of addresses 117. The Com field 54 of the outgoing token is checked 118 and if the Com field does not indicate a retransmission of a voice packet or token and if the Com field does not request a port to be attached or detached 122, then the port returns to waiting for the next signal 100. If the Com field indicates a request to retransmit a voice packet or a token form the present port 119, then the switch 32 is requested to retransmit a previous voice packet or token 121. If the Com field indicates an attach or detach 123, then a port is added or removed from the valid list of addresses 124 and the port returns to waiting for the next incoming signal 100.

While the invention has been particularly shown and described with reference to preferred embodiments thereof, it will be understood by those skilled in the art that various changes in form and details may be made without departing from the spirit and scope of the invention.

What is claimed is:

1. A token over Ethernet protocol allows voice and digital devices to communicate over a shared channel, comprising:
    a) a plurality of network nodes with unique addresses connected in parallel to a shared channel,
    b) voice and data information flow between said plurality network nodes in packets with tokens to control said flow,
    c) said packets identify a source address and a destination address for said voice and data information contained therein,
    d) said tokens created by a transmitting network node include a current address and a next address to transmit and are placed onto said channel by said transmitting network node, said tokens each including an end of token flag field.

2. The token over Ethernet protocol of claim 1 wherein, said shared channel is a conduction medium connected to all said plurality of network nodes.

3. The token over Ethernet protocol of claim 1 wherein, said shared channel is a transmission medium common to all said plurality of network nodes.

4. The token over Ethernet protocol of claim 1 wherein, said token contains a plurality of fields comprising synchronization bits, current transmit port, next transmit port, packet type, number of cell, voice packet ID, command, number of transmit port, retransmit port address, error correction, cyclic redundancy code, and the end of token flag.

5. The token over Ethernet protocol of claim 1 wherein, each network node of the plurality of network nodes communicates both voice signals and data signals over said shared channel.

6. The token over Ethernet protocol of claim 1 wherein, each network node of the plurality of network nodes communicates either voice signals or data signals over said shared channel.

7. The token over Ethernet protocol of claim 1 wherein, equal transmission bandwidth is provided for each network node of said plurality of network nodes by selecting said next address to transmit in order from a list of addresses contained in said each network node.

8. The token over Ethernet protocol of claim 1 wherein, a transmitting network node gives priority to a voice signal over a data signal to minimize voice signal delay and to maintain a quality voice signal at a receiver.

9. A method of transmitting a packet over a shared channel, comprising:
    a) checking an incoming token and if said incoming token does not match a port address, then compare present transmit port field with previous transmit port field,
    b) continuing to monitor channel for incoming tokens if local address is not skipped,
    c) sending a collision pattern if local address is skipped and channel is idle,
    d) continuing to try to send said collision pattern if channel is not idle,
    e) transmitting an updated token with Com field indicating an add of local address to list of active addresses and then return to monitoring said channel for incoming tokens if channel is idle and if local address has been skipped,
    f) checking said incoming token and if said incoming token matches said port address, then checking to see if packet is ready to be transmitted,
    g) transmitting an updated token if there has not been a collision and if said packet is not ready to transmit,
    h) returning to monitoring said channel for said incoming token if there has been a collision and if said packet is not ready to transmit,
    i) transmitting a packet if there has not been a collision and said packet is ready to transmit, j) returning to monitoring said channel for said incoming token if there has been a collision and said packet is ready to transmit.

10. The method of claim 9 wherein, transmitting said packet containing a voice signal is done if there has not been a collision and said packet is ready to transmit.

11. The method of claim 9 wherein, transmitting said packet containing a data signal is done if there is not a packet containing a voice signal waiting to be sent and if there has not been a collision and said packet is ready to transmit.

12. The method of claim 9 wherein, comparing present token port field with previous token port field indicates a skipped address if address of network node has been skipped.

13. A method of receiving a packet over a shared channel, comprising:

a) waiting for a next incoming signal to a network node and checking said incoming signal for a token, b) dropping a received packet if the incoming signal is not a good packet, c) receiving packet and returning to waiting for said next incoming signal if said incoming signal is a good packet, d) updating token Com field, Num port field, port address field, and transmit port field, determine token address and send to transmitting module, then returning to waiting for said next incoming signal if the received token is not good, e) checking packet type if token is good and updating transmit port field of outgoing packet if there is no received packet error, f) updating Com field, Num port field and port address of outgoing token before updating transmit port field if said received packet contains an error, g) checking current token Com field and requesting switch located in said network node to retransmit previous voice packet or token if Com field indicates retransmit for voice packet or token, h) returning to waiting for next incoming signal if Com field does not equal attach or detach port, and removing port from valid list before returning to waiting for next incoming signal if Com field equals detach port or adding port to valid list before returning to waiting for next incoming signal if Com field equals attach port.

14. The method of claim 13 wherein, calculating a cyclic redundancy code (CRC) is done by a receiving unit of said network node and compared to said CRC of said received packet to check for a transmission error of said received packet.

15. The method of claim 13 wherein, re-transmitting of a received token is requested by a receiving unit in the network node by setting the Com field of an outgoing token to retransmit and appending address of port to retransmit said token.

16. The method of claim 13 wherein, determining said network node has been skipped uses addresses contained in current transmit port field and a next transmit port field in said token.

17. The method of claim 13 wherein, determining whether packet following said token should be received by said network node uses address contained in said current transmit port field in said token.

* * * * *